April 2, 1957    R. G. CHAUVEL    2,787,144
SLIDING COUPLING DEVICE FOR COAXIAL ROTARY SHAFTS
Filed May 6, 1955
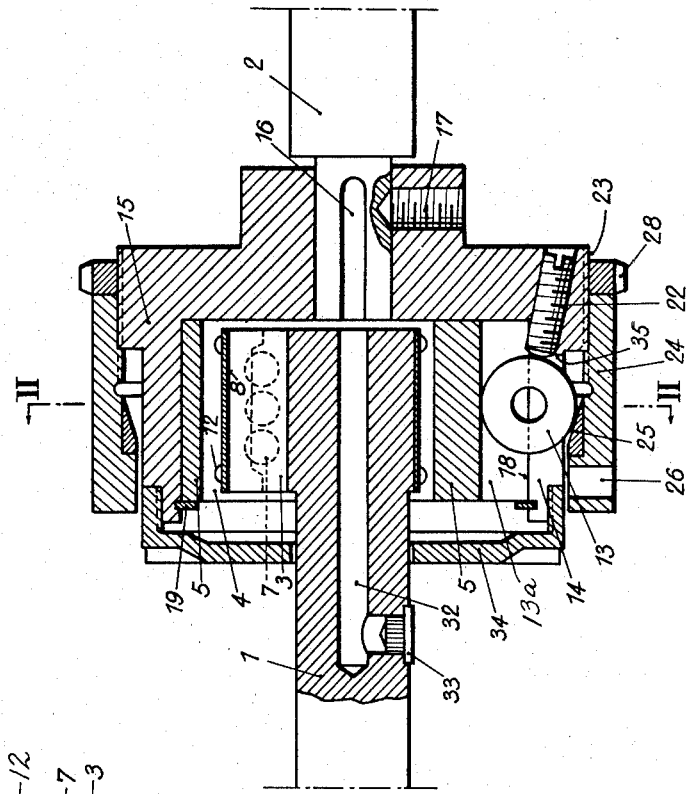
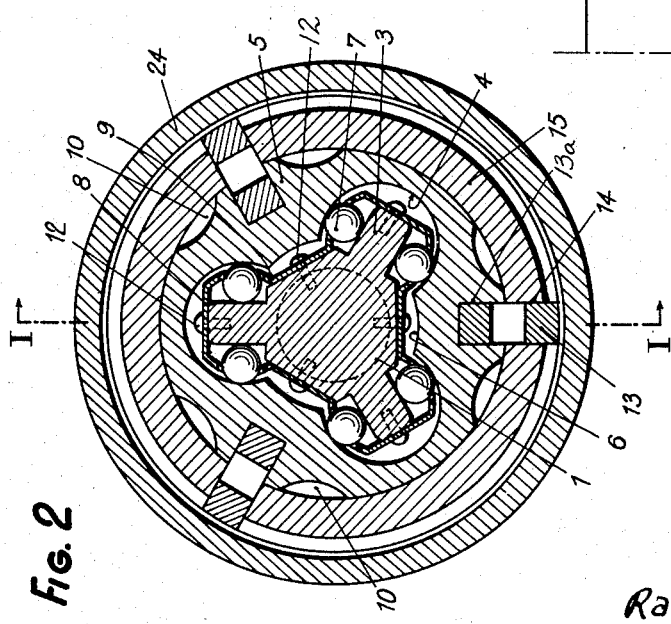
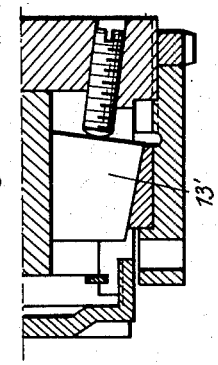
Inventor:
Raymond G. Chauvel
by: J. Delattre-Seguy
Attorney

United States Patent Office 2,787,144
Patented Apr. 2, 1957

2,787,144

SLIDING COUPLING DEVICE FOR COAXIAL ROTARY SHAFTS

Raymond G. Chauvel, Velizy, France, assignor to Societe a Responsabilite Limitee dite: Gambin & Co., Billancourt, France Application May 6, 1955, Serial No. 506,631

Claims priority, application France May 14, 1954

8 Claims. (Cl. 64—23)

The present invention relates to a sliding device for coupling coaxial rotary shafts.

One object of the invention is to provide a coupling device of the type hereinabove mentioned, i. e. a coupling device allowing an axial movement of the driving shaft relative to the driven shaft while ensuring a perfect connection of the two shafts in rotational direction without the least circumferential or angular play, neither in one rotational direction nor in the other.

Another object of the invention is to provide a coupling device of the type hereinabove mentioned in which it is possible, by means of a simple adjusting operation, to make up at any moment, for the unavoidable deviation from the true dimensions due to machining tolerances as well as to occasional wear of the various members, by eliminating in a perfect manner any angular play likely to occur subsequent to such wear.

Sliding coupling devices for coaxial rotary shafts are already known which comprise a first driving member adapted to be made rigid with one of the two rotary shafts and provided with at least one driving element extending in a substantially radial plane, a second driving member adapted to be made rigid with the other rotary shaft and provided with a corresponding number of recesses embracing said radial elements, and rolling members inserted between said driving elements and the corresponding walls of said recesses.

However, in the existing coupling devices of this type, it is practically impossible that the two halves of the coupling device do not have some circumferential play, as small as it may be. Furthermore, they are not adapted for eliminating the circumferential play which may not be avoided after some time of operation owing to the wear of the members in contact. For some applications of precision, it is necessary that such play be completely eliminated, all the more when the movements of the shafts are likely to occur at relatively high speeds and frequencies.

The coupling device according to the invention makes it possible to obtain this result. It is characterized in that the second driving member is slightly resiliently deformable so as to allow varying the width of said recesses in circumferential direction, and in that means are provided for adjusting the amount of resilient deformation of the second driving member in order to permit the elimination of any circumferential play between the two driving members.

Other and further objects and advantages of the invention will be apparent to those skilled in the art from a consideration of the following description of two specific embodiments of the invention, shown by way of examples, in the accompanying drawings, in which:

Fig. 1 is an axial section taken along the line I—I of Fig. 2 of a coupling device embodying the invention, Fig. 2 is a corresponding cross-section taken along the line II—II of Fig. 1, and Fig. 3 illustrates a modification of a detail of Fig. 1.

Referring to the drawings, 1 and 2 are end portions of two coaxial shafts which are to be coupled in such a manner that there is strictly no angular play between said shafts, neither in one rotational direction nor in the other, provision being made, however, for axial relative sliding movement of the two shafts over a predetermined length. The coupling device according to the invention, which will now be described, secures these results.

The end potrion of the shaft 1 has been formed into a particular shape, but it will be understood that such a shape could be imparted to an intermediate part mounted on the shaft 1. This shape includes a number (three in the drawing by way of example) of longitudinal radial ribs 3, for instance of hardened steel, the planar faces of which are ground perfectly parallel.

The driving ribs 3 are housed inside ground cylindrical recesses 4 parallel with the common axis of the shafts 1 and 2 and machined in a so-called driving part 5, for instance also of hardened steel. The central portion of the driving part 5 is hollow and bounded by portions of a cylindrical surface 6 intersecting the recesses 4. The inner surface of the driving part 5 therefore, has a cross-section (Fig. 2) somewhat in the shape of a trefoil.

Between the ribs 3 and the surface of the recesses 4 are inserted rolling members which, in the present embodiment, consist of balls 7. By way of example, on each side of the ribs 3, there has been represented three balls 7 but this number, of course, could be different. The balls 7 are guided by spacers 8 and 9 of suitable shape secured to the driving members 3 as by means of rivets 12.

The spacers 8 and 9, however, have a limited duty namely to retain the balls in longitudinal direction in order to prevent them from rolling out of their recesses and there is provided ample clearance between the balls and the spacers. Actually, it is clear that the shape of the cylindrical recesses 4 and their location with a respect to the driving ribs 3 are sufficient for determining the position of the balls in a transverse direction. The length of the radius of curvature of the cylindrical recesses 4 will be taken such that the balls do not tend to get jammed while though perfectly retained in position. In this respect, it may be advantageous to substitute a surface having a plurality of radii for the cylindrical surface 4 and, for instance, to design the rollways for the balls in the shape of two portions of cylindrical surfaces the radii of which would be shorter than the radius of the single cylindrical surface 4 represented in the drawing.

It should be noted that the recesses 4 are located quite near the outer surface of the driving member 5. The purpose of this arrangement is to create, in this member, zones of least strength in order to permit of more or less reducing the width of the recesses 4 by distortion of this member, in order to eliminate any angular play between the parts 1 and 5 connected together through the medium of the balls 7 inserted therebetween.

The flexibility of the member 5, furthermore, may be increased by providing in this member suitable notches such as those indicated by way of example as to 10 in Fig. 2.

In order to provide for accurate adjustment of such a distortion, provision is made, in the driving member 5, of longitudinal grooves 13a in which pressure elements or rollers 13 are engaged without any clearance. The grooves 13a are equally spaced from the zones of least strength of the driving member 5. The rollers 13 extend through slots 14 as wide as the grooves 13a and extending through a cup shaped member 15 made rigid with the shaft 2, for instance by means of a key 16 and a set screw 17. The driving member 5 has its outer surface cylindrical and is housed without clearance within a corresponding bore 18 of the cup shaped member 15. It is held in place against the bottom of this bore by any suitable conventional means such as, for instance, a resilient ring 19 engaged in a complementary annular groove of said cup shaped member, and it is connected in rotational direction with said cup shaped member by the rollers 13 which act as keys. Mounted in the cup shaped member 15 are three screws 22 against which the rollers 13 are adapted to bear.

The outer surface of the cup shaped member 15 is cylindrical and has a screw thread 23 on which may be more or less screwed an adjusting ring 24 the bore of which is furnished with a conical camming face 25 of ground hardened steel adapted also to bear against the rollers 13. Radial holes 26 drilled through the ring 24 make it possible to readily rotate said ring by means of a rod or hook-spanner. The ring 24 may be clamped in any required position on the cup shaped member 15 by means of a locking nut 28 also threadedly engaged on the screw thread 23 of the cup shaped member.

An axial bore 32 in the shaft 1 communicates with a lubricator 33 in order to direct lubricant to the balls 7 and a cover 34 screwed on the cup shaped member 15 prevents any foreign matter from entering the coupling device.

The operation of the coupling device hereinabove described is the following:

Being assumed, at present, that there is no play between the balls 7 and the surfaces of the ribs 3 and the recesses 4, it is clear that the shafts 1 and 2 are perfectly made rigid with each other in rotational direction by the ribs 3, the balls 7, the recesses 4 of the driving member 5, the rollers 13 acting as keys and the cup shaped member 15. As a contrast, an axial relative movement of one shaft relative to the other is in no way hindered and in the course of such a movement the ribs 3 move along the recesses 4 causing the balls 7 to roll. It is clear that such a movement may take place quite smoothly since no part of the coupling device is in frictional engagement with another during such movement.

At the moment of assembling the coupling device, or when a slight angular play has been created owing to some wear even though very small, such play may be entirely eliminated by the following procedure:

The locking nut 28 is released and the ring 24 is screwed on some more on the cup shaped member 15. This movement causes the conical camming face 25 to slightly push the rollers 13 toward the axis of the device since the screws 22 are fixed with respect to the cup shaped member 15. This results into the driving member 5 being slightly distorted in the zones thereof of least strength located in the neighbourhood of the radii extending through the axes of the recesses 4, so that the walls of each recess in contact with the balls get nearer each other. The ring 24 is screwed on until complete elimination of the angular play and the locknut 28 is then clamped again.

The purpose of the screw 22 is to permit of an individual compensation in the machining tolerance or wear of the various parts of the coupling device. Actually, it is readily understood that if one of the screws 22 is clamped more tightly, the roller 13 in engagement with said screw is caused to climb somewhat higher on the conical camming face 25 of the adjusting ring and, therefore, the corresponding recess 4 is contracted, other factors being equal. Therefore, the rotary ring 24 constitutes a general adjusting means whereas the screws 22 constitute individual adjusting means.

It will be readily understood that the coupling device operates exactly under the same conditions in both rotational directions.

In Fig. 3, a modification is illustrated in which the rollers 13 of the embodiment which has just been described have been replaced by prismatic blocks in the shape of wedges 13' (Fig. 3) which act in a similar manner. The use of such wedges will be beneficial in coupling devices in which the distortion efforts required reach relatively heavy values.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Thus, for example, the individual adjusting screws 22 may be omitted and the rollers 13 bear directly against the bottom 35 of the slots 14 of the cup shaped member 15.

What I claim is:

1. Sliding coupling device for coupling two coaxial rotary shafts comprising in combination: a first driving member adapted to be made rigid with one of said shafts, at least one driving element rigid with said driving member and extending in a substantially radial plane, a second driving member adapted to be made rigid with the other shaft and provided with a number of recesses equal to the number of said radial driving elements and embracing said elements, said second driving member being slightly resiliently deformable for enabling the width of said recesses to be varied in circumferential direction, rolling members inserted between said radial driving elements and the walls of said recesses facing said radial driving members, and adjusting means carried by said second driving member for adjusting the amount of resilient deformation of said second driving member in order to permit of eliminating any circumferential backlash between said two driving members and, hence, between said two shafts.

2. Coupling device according to claim 1, wherein said second driving member is constituted by two parts namely: a cup shaped part adapted to be rigidly mounted on the corresponding shaft and having a cylindrical bore, and an inner cylindrical part fitted and rigidly mounted in said bore of said cup shaped part and provided with said recesses, said adjusting means comprising a camming face adjustably mounted on said cup shaped part, and pressure elements adapted to engage on one hand said camming face and on the other hand said inner part at points thereof intermediate said zones of least strength in order to exert upon said inner part radial inward pressures under the action of said camming face.

3. Coupling device according to claim 1, wherein said second driving member is constituted by two parts namely: a cup shaped part adapted to be rigidly mounted on the corresponding shaft and having a cylindrical bore, and an inner cylindrical part fitted in said bore of said cup shaped part and provided with said recesses, means being provided for axially retaining said inner part within said cup shaped part, said adjusting means comprising a camming face adjustably mounted on said cup shaped part, and pressure elements extending without clearance through registering radial slots of said cup shaped part and said inner part respectively for serving as key means for making these two parts fixed with respect to each other in rotational direction, said pressure elements being adapted to engage on one hand said camming face and on the other hand said inner part at points thereof intermediate said zones of least strength in order to exert upon said inner part radial inward pressures under the action of said camming face.

4. Coupling device according to claim 2, wherein said pressure elements are constituted by cylindrical rollers.

5. Coupling device according to claim 2, wherein said pressure elements are constituted by wedges.

6. Coupling device according to claim 1, wherein said second driving member is constituted by two parts namely: a cup shaped part adapted to be rigidly mounted on the corresponding shaft and having a cylindrical bore, and an inner cylindrical part fitted and rigidly mounted in said bore of said cup shaped part and provided with said recesses, said adjusting means comprising: a conical inner camming face carried by said cup shaped part and adapted to be longitudinally adjustable with respect thereto, and pressure elements adapted to engage on one hand said camming face and on the other hand said inner part at points thereof intermediate said zones of least strength in order to exert upon said inner part radial inward pressures under the action of said camming face.

7. Coupling device according to claim 6, wherein said conical inner camming face is carried by a coaxial annular part adapted to be screwed on said cup shaped part.

8. Coupling device according to claim 6, with adjustment compensating screws threadedly engaged through said cup shaped member and adapted to cooperate respectively with said pressure elements in order to cause the latter individually to climb higher or lower on said camming face.

References Cited in the file of this patent

FOREIGN PATENTS 849,049     Germany ---------------- Sept. 11, 1952